United States Patent [19]

Nel

[11] Patent Number: 4,961,531
[45] Date of Patent: Oct. 9, 1990

[54] IRRIGATION METHOD AND APPARATUS

[76] Inventor: Barend J. M. Nel, P O Box 13, Louis Trichardt, North Eastern Tvl, South Africa, 0920

[21] Appl. No.: 247,235

[22] Filed: Sep. 21, 1988

[30] Foreign Application Priority Data

Sep. 22, 1987 [ZA] South Africa ................. 87/7102

[51] Int. Cl.$^5$ .................. B05B 3/02; B05B 3/18; B05B 17/04
[52] U.S. Cl. ........................ 239/1; 239/728; 239/739; 239/DIG. 1
[58] Field of Search .............. 239/1, 728, 729, 726, 239/739, DIG. 1

[56] References Cited

U.S. PATENT DOCUMENTS

| 1,108,528 | 8/1914 | Todd et al. ............... 239/728 |
| 2,001,180 | 5/1935 | Buckner .................. 239/728 |
| 2,988,287 | 6/1961 | Sherman .................. 239/726 |
| 3,536,261 | 10/1970 | Van Den Brink . | |
| 3,901,442 | 8/1975 | Chapman . | |
| 3,921,908 | 11/1975 | Zimmerer ................ 239/729 |
| 3,979,062 | 9/1976 | Christensen et al. ....... 239/729 |
| 4,011,990 | 3/1977 | Meis et al. ............... 239/729 |
| 4,227,648 | 10/1980 | Holloway et al. . | |
| 4,240,582 | 12/1980 | Anderson et al. . | |
| 4,249,698 | 2/1981 | Smith et al. ........... 239/DIG. 1 |
| 4,323,194 | 4/1982 | Newbold et al. . | |
| 4,569,481 | 2/1986 | Davis et al. ............. 239/729 |
| 4,674,681 | 6/1987 | Meis et al. . | |

Primary Examiner—Andres Kashnikow
Assistant Examiner—Michael J. Forman
Attorney, Agent, or Firm—Nixon & Vanderhye

[57] ABSTRACT

A mechanized irrigation system and method of irrigation is disclosed and claimed. The system 10 comprises a main irrigation pipe 11 carrying a plurality of sprinklers 15 for applying liquid to a land 13 in relatively smaller regions along the pipe 11. A wheeled support structure supports the pipe 11 in a position spaced above land 13. Secondary sprayer carrying pipe 18 is rotatably mounted on and communicates with the main pipe 11. The main pipe 11 is anchored at 14 and is connectable to a hydrant. The arrangement is such that the secondary pipe 18, in use, distributes at least some of the liquid to be applied to the land 13 at a rate higher than the infiltration rate of the land over a larger region thereby to limit run-off of the liquid.

9 Claims, 2 Drawing Sheets

IRRIGATION METHOD AND APPARATUS

This invention relates to irrigation systems and in particular to mechanised sprinkler irrigation systems.

One known mechanised system is the so-called centre-pivot system. This system comprises a long, sprinkler carrying irrigation pipe, supported above the ground and substantially parallel thereto, by a series of spaced, wheeled towers. The system is anchored at one end thereof by a concrete block so that the system in use may rotate about the anchor point. It will be appreciated that during rotation, towers towards the free end of the pipe travel faster than those towards the anchored end. In particular a tower twice as far from the anchor point as a tower closer thereto will travel twice as fast about the anchor point.

Assuming that, in use, a certain amount of water, say $X m^3/hour$ must be applied in the region of the closer of the above two towers then it follows that double that amount, i.e. $2. \times m^3/hour$ should be applied at the outer tower to ensure that substantially the same volume of water is applied per unit area over the whole area to be irrigated.

It is known that different soil types have different infiltration capacities. Thus should the application rate in mm/hour exceed the infiltration capacity of the soil, it will result in a run-off of water with a consequent wastage of water and of course also erosion of the land.

It is accordingly an object of the present invention to provide an alternative mechanised irrigation system and a method of irrigation with which it is believed the aforementioned problems will at least be alleviated.

According to the invention a mechanised irrigation system comprises:
a main irrigation pipe;
a wheeled support structure for supporting the main pipe in a position spaced above a land to be irrigated;
the pipe carrying a plurality of suitable sprayers suitably spaced thereon for applying liquid to the land in relatively smaller regions along the pipe;
at least one secondary sprayer carrying structure mounted on the main pipe for movement relative thereto;
the main pipe and secondary structure being adapted to be connected to a liquid source; and
the arrangement being such that the secondary sprayer carrying structure, in use, distributes at least some of the liquid to be applied at a rate higher than the infiltration rate of the land to be irrigated over a larger region thereby to limit run-off of the liquid.

The secondary sprayer carrying structure may comprise a secondary irrigation pipe carrying a plurality of suitable sprayers and which pipe communicates with the main irrigation pipe.

The secondary pipe may be mounted on the main irrigation pipe to rotate about a pivot at the centre of the secondary pipe and in a plane substantially parallel to the plane wherein the main pipe, in use, moves over the land.

The main irrigation pipe, in use, may be anchored towards one end thereof and the secondary pipe may be mounted on the main pipe towards the other end thereof.

In the preferred embodiment the system comprises means for rotatably driving the secondary pipe about the pivot.

It will be appreciated that with the system according to the invention the secondary pipe may be caused to rotate at a suitable speed relative to the rotating main pipe thereby to distribute water in the region towards the main pipe's faster travelling free end, over an increased area.

Also included within the scope of the present invention is a method of irrigating a land comprising the steps of:
providing a mechanised irrigation system comprising a main irrigation pipe carrying a plurality of sprayers and a secondary sprayer carrying structure mounted on the main pipe for movement relative thereto;
causing the main pipe to traverse the land and to apply liquid to the land in relatively smaller regions along the pipe via the sprayers thereon; and
causing the secondary structure to move relative to the main pipe and to distribute at least some of the water to be applied to the land at a rate higher than the infiltration rate of the land over a larger region thereby to limit run-off of the liquid.

The invention will now be described, by way of example only, with reference to the accompanying diagrams wherein.

Figure 1:
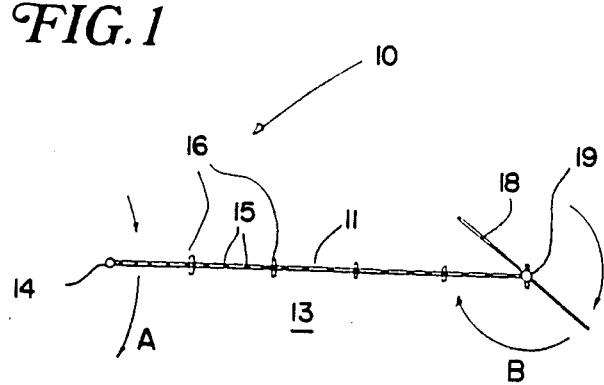
FIG. 1 is a line diagram in plan of one embodiment of the system according to the invention.
Figure 3:
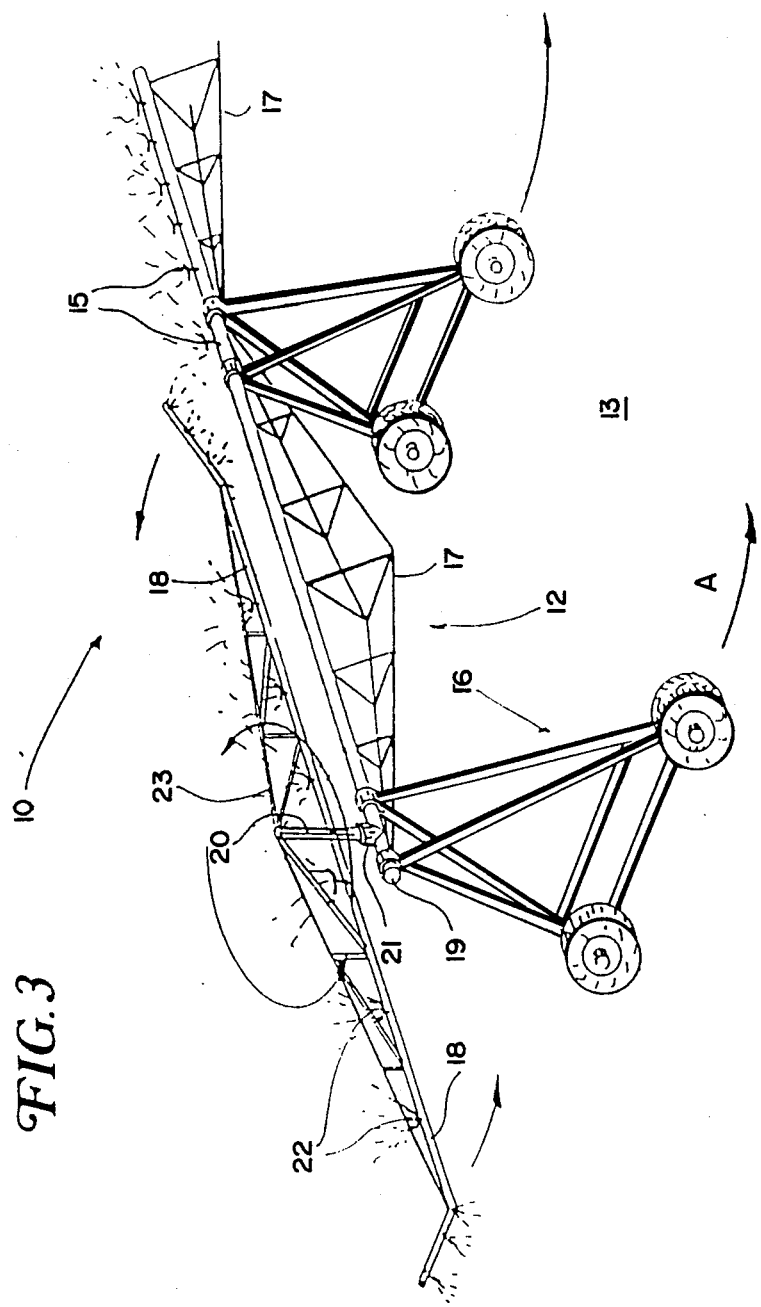
FIG. 3 is a diagrammatic perspective view of the region towards a free end of the system in FIG. 1.

One embodiment of the mechanised sprinkler irrigation system according to the invention is shown in FIGS. 1 and 3 and is designated generally by the reference numeral 10.

System 10 comprises a main irrigation pipe 11 supported by a wheeled support structure 12 (more clearly shown in FIG. 3). The main pipe 11 is carried in a position spaced above the land 13 to be irrigated and substantially parallel thereto.

The system is anchored at one end 14 thereof by a concrete block (not shown) so that, in use, it may rotate about the anchor in the direction of the arrow designated A.

The main pipe 11 is adapted to be connected to a hidrant (also not shown) at end 14 thereof. On main pipe 11 there are mounted a plurality of spaced sprinklers 15.

As best shown in FIG. 3, the support structure 12 comprises a plurality of spaced wheeled towers 16 and a truss structure 17 extending between each pair of adjacent towers 16.

The system is characterised in that a rotatable secondary pipe 18 is mounted on main pipe 11 at the free end 19 thereof. Secondary pipe 18 communicates with main pipe 11 through hollow axle 20 and is also rotatable about the longitudinal axis of this axle. Secondary pipe 18 has a length twice the distance between two wheeled towers 16 and is supported on main pipe 11 at its centre by axle 20 extending from socket 21.

On secondary pipe 18 there are also mounted a plurality of spaced sprinklers 22. A suspended cable structure 23 extending from the free end of axle 20 maintains pipe 18 in a position substantially parallel to main pipe 11.

Hence, in use, the water to be applied at the higher rate towards the free end of main pipe 11, as explained hereabove, is distributed over an enlarged area by rotating secondary pipe 18. By selecting a suitable speed of rotation and with the enlarged distribution area, it can be ensured that the infiltration capacity of the soil in that region is not exceeded.

Figure 2:
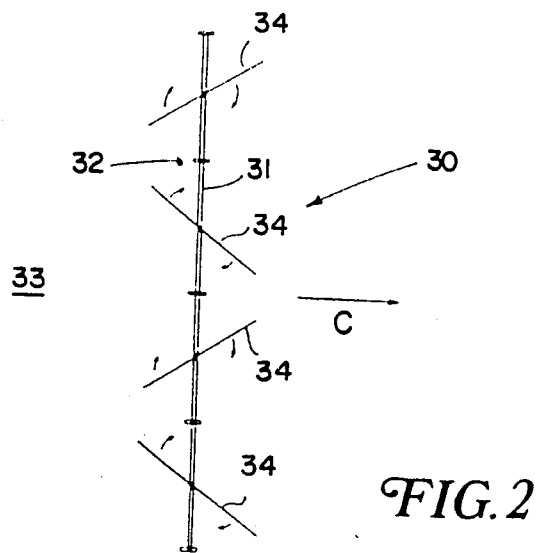
FIG. 2 is a similar diagram of a second embodiment of the system according to the invention.

In FIG. 2 there is shown another embodiment of the mechanised irrigation system according to the invention. This system 30 comprises a main irrigation pipe 31 supported by a wheeled support structure 32 at a position spaced from and substantially parallel to the surface of the land 33 to be irrigated. The system is adapted to move over the land in the direction of the arrow C. The pipe 31 which is adapted to be connected to a hidrant (not shown) and may have a plurality of sprinklers (also not shown) mounted thereon in a manner similar to that of pipe 11 in FIGS. 1 and 3.

Also mounted on main irrigation pipe 31 are a plurality of secondary sprinkler carrying irrigation pipes 34. These pipes 34 are each rotatable about a centrally disposed pivot.

It will be appreciated that with this arrangement the area over which the water in the main pipe 31 is distributed, may be increased.

Any suitable means may be provided for causing rotation of secondary pipe 18 in the embodiment in FIGS. 1 and 3 and secondary pipes 34 in the embodiment in FIG. 2. Such means may include electrical motors, hydraulic drive mechanisms or the jet action of water exiting through the sprinklers suitably mounted on the relevant pipe.

It will also be appreciated that many variations in detail on the system and the method according to the invention are possible without departing from the spirit and scope of the appended claims.

I claim:

1. A method of operating a mechanised irrigation system to irrigate a land, the system comprising a movable elongated irrigation pipe carrying a plurality of primary sprayers capable of applying liquid to the land at volumetric rates falling within a first, lower range of rates, and at least one secondary sprayer carrying structure which is movable relative to the main pipe and capable of applying liquid at volumetric rates falling within a second range of rates, higher than the first range, the method comprising the steps of:
   (a) driving the main pipe to traverse the land to be irrigated;
   (b) causing the primary sprayers to apply liquid to the land in an elongate region substantially parallel to the dimension of elongation of the main pipe at rates falling within the first range of rates;
   (c) causing the at least one secndary sprayer to apply liquid to the land at a rate falling within the second range of rates, higher than the first range; and
   (d) driving the secondaary structure to continuously move it relative to the main pipe to cause the secondary sprayers to apply liquid to a portion of the elongate region and beyond the elongate region, to thereby limit run-off of liquid applied at the second, higher rate.

2. A method as claimed in claim 1 wherein step (a) is practiced to rotate the main pipe about a pivot at one end thereof, and step (d) is practiced to rotate at least one secondary sprayer with respect to the main pipe.

3. A mechanised irrigation system comprising:
   an elongated main irrigation pipe connectable to a liquid source;
   a wheeled support structure comprising a plurality of spaced wheeled towers for supporting the main pipe in a position spaced above a land to be irrigated and for carrying the main pipe over the land;
   the main pipe having a plurality of primary sprayers mounted thereon and spaced from each other in the dimension of elongation of the main pipe, said primary sprayers for applying liquid to the land in an elongate region substantially parallel to the dimension of elongation of the main pipe;
   said primary sprayers comprising means for applying liquid at volumetric rates falling within a first, lower, range of rates;
   at least one secondary sprayer carrying structure having a plurality of secondary sprayers mounted thereon in spaced relationship;
   said secondary sprayers comprising means for applying liquid at volumetric rate falling within a second range of rates, higher than said first range;
   means for mounting the secondary structure for movement relative to the main irrigation pipe to enable the secondary sprayers to apply liquid in a portion of the elongate region and also beyond the elongate region; and
   means for driving the wheeled support structure and the secondary sprayer structure, so as to cause the main pipe to traverse the land to be irragated, and the second structure to be driven continuously to move relative to the main pipe, so that the secondary sprayers apply liquid in the elongate region and therebeyond so that run-off of liquid applied at the higher rates by the secondary sprayers is limited.

4. A system as claimed in claim 3 wherein each secondary structure comprises a secondary irrigation pipe having the secondary sprayers spaced thereon, and wherein each said mounting means comprises means for mounting each secondary pipe on the main pipe to rotate about an axis through the center of the secondary pipe.

5. A system as claimed in claim 4 wherein the main pipe, in use, is anchored at a first end thereof to rotate about said first end, and the secondary pipe is mounted on the main pipe towards a second end thereof, opposite the first end.

6. A system as claimed in claim 5 wherein the primary sprayers are mounted on the main pipe in a region of the main pipe towards the pivot, for applying liquid to the land in a circular region abut the pivot during each rotation of the main pipe; and wherein the secondary sprayers on the secondary pipe are provided so that during each rotation of the main pipe they apply liquid in a concentric annular region radially outwardly and adjacent said circular region.

7. A system as claimed in claim 4 wherein a plurality of secondary pipes carrying secondary sprayers are provided on the main pipe, and wherein the drive means causes the main pipe to traverse the land in a direction perpendicular to the longitudinal axis of the main pipe and each secondary pipe to rotate about an axis through its center.

8. A system as claimed in claim 7 wherein the wheeled towers are evenly spaced along the length of the main pipe and wherein each secondary pipe has a length substantially equal to the distance between two adjacent towers.

9. A system as claimed in claim 3 wherein the wheeled towers are evenly spaced along the length of the main pipe, and wherein the secondary pipe, which has a length equal to substantially twice the distance between two adjacent towers, is mounted at one end of the main pipe.

* * * * *